United States Patent [19]
Bergeron et al.

[11] 3,937,644
[45] Feb. 10, 1976

[54] APPARATUS FOR APPLYING A BACKING OF PLASTIC MATERIAL TO A CUTTING BLADE

[75] Inventors: Claude A. Bergeron; Hubert L. Smith, both of Staunton, Va.

[73] Assignee: Philip Morris Incorporated, New York, N.Y.

[22] Filed: Oct. 31, 1974

[21] Appl. No.: 519,562

[52] U.S. Cl. ............... 156/498; 156/244; 156/500; 156/510; 198/131; 198/193
[51] Int. Cl.² ..................... B32B 31/18; B65G 15/30
[58] Field of Search ........... 156/244, 390, 500, 538, 156/573, 498, 510, 522; 30/346.53, 346.58, 346.59, 346.6, 348, 357; 117/43; 198/131, 193; 118/239, 324

[56] References Cited
UNITED STATES PATENTS

| | | |
|---|---|---|
| 2,582,913 | 1/1952 | Pfefferle ......................... 30/346.53 |
| 2,828,001 | 3/1958 | Borneman........................... 198/131 |
| 3,081,213 | 3/1963 | Chinn ................................. 158/244 |
| 3,655,031 | 4/1972 | Cahn................................... 198/131 |

Primary Examiner—Caleb Weston
Attorney, Agent, or Firm—Watson Leavenworth Kelton & Taggart

[57] ABSTRACT

An apparatus for and method of forming a backing of plastic material at the rear edge of a cutting blade in which the edge is firmly imbedded by passing a conveyor on which the blades are arranged seriatim through an extrusion die the conveyor having feed lugs engaging the ends of the blades adapted also to maintain an accurate lateral position of the blades on the conveyor through the die, and continuing the advance through a cooling means and then through a cutting mechanism which severs the strip into individual blade units.

7 Claims, 8 Drawing Figures

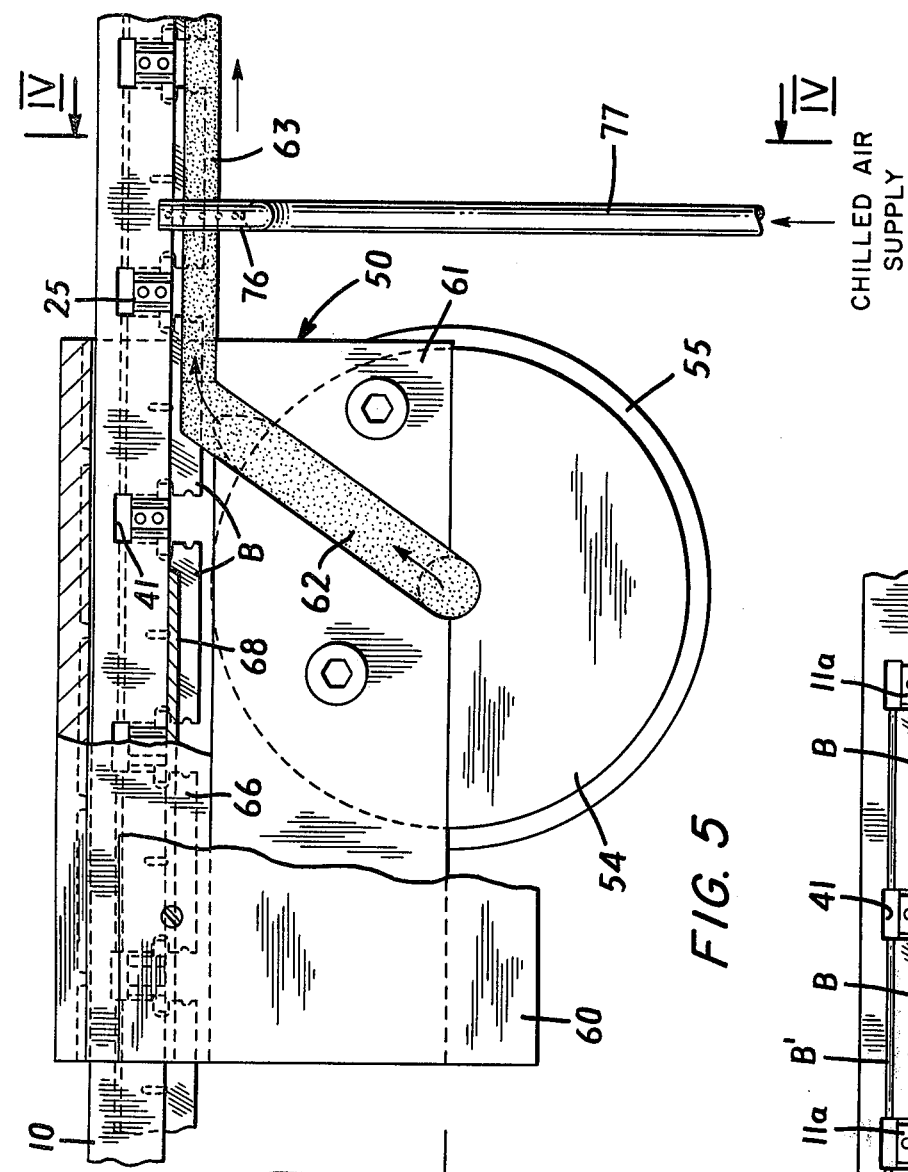
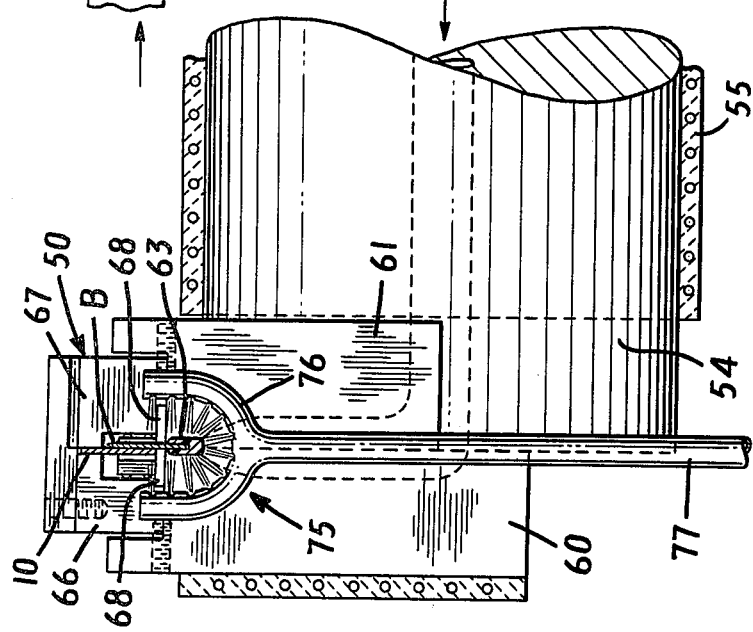
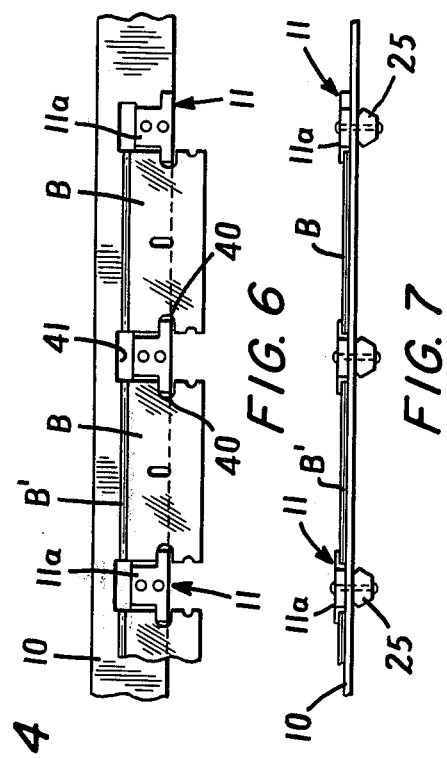
FIG. 5
FIG. 4
FIG. 6
FIG. 7

APPARATUS FOR APPLYING A BACKING OF PLASTIC MATERIAL TO A CUTTING BLADE

The invention concerns the application of a backing to cutting blades such as razor blades. Cutting blades have long been on the market of a type such as what has been known as the "Gem" razor blade comprising a thin flat blade portion of cutting steel and a reinforcing backing of metal of different character folded in a U-shape around the back edge and permanently secured to the blade proper by suitable means such as staking.

The present invention in general is directed to producing a backed blade of the type referred to but having a backing of molded plastic material. The backing is applied in a continuous rapid and economical manner in which the blades are advanced on a conveyor belt through an extrusion die which casts a continuous strip of plastic material in which the back edges of the successive blades are embodied, the strip continuing on through a cooling means and then to a severing means where the plastic strip is cut between blades to result in the final blade units.

It has of course long been known to apply a plastic binder to an edge of an article and in a continuous process such as in bookbinding, one such instance being a U.S. Pat. to Becker, No. 3,223,436. In another example, U.S. Pat. to Harding, No. 3,328,220, a plastic closure is applied to the ends of bags in a continuous process in which the bags are fed on a conveyor past an extrusion die where a U-shaped plastic strip is extruded then subsequently folded down and compressed around the bag ends, the strip continuing on through cooling means and, if desired, a strip severing means. The U.S. Pat. to Pfefferle, No. 2,582,913 discloses the general idea of a razor blade having a small cutting edge strip adhesively secured to a main plastic supporting body.

The present invention provides substantial advantages over the prior art of the foregoing character as will become apparent from a more detailed disclosure thereof. It embodies an apparatus and provides a method in which individual blades are deposited successively at high speed on a continuously operating endless conveyor belt, the strip feeding mechanism having lugs for positioning accurately the blades in a central and lateral position arranged seriatim on the belt while passing through the extruding die where a continuous strip of thermoplastic is cast around the back edges of the successive blades in a controlled manner and by continuing the advance of the conveyor through a cooling means for setting the thermoplastic material the required dimensional tolerance as per the configuration of the blade with the back edges fully imbedded therein is attained. The advance of the blade strip is continued to a strip severing means for cutting between the ends of the adjacent blades, a loop accumulating means being provided between the cooling means and the severing means, the severing means being driven by a timing belt linked to the main drive shaft operating the blade feed means and conveyor means, but operating intermittently as distinguished from the continuous feed of the blade strip as it exits from the extrusion die and cooling means.

Other features of the apparatus and method will be revealed in connection with the description to follow and the accompanying drawings disclosing a representative embodiment of the invention.

In the drawings:

FIG. 4 is a vertical cross sectional view taken on the plane IV—IV of FIG. 1 and also the plane IV—IV of FIG. 5.

FIG. 6 is a fragmentary view in elevation looking toward the outer face of the feed belt with the blades in position thereon.

FIG. 7 is a top plan view of the belt with blades entrained thereon.

Figure 1:
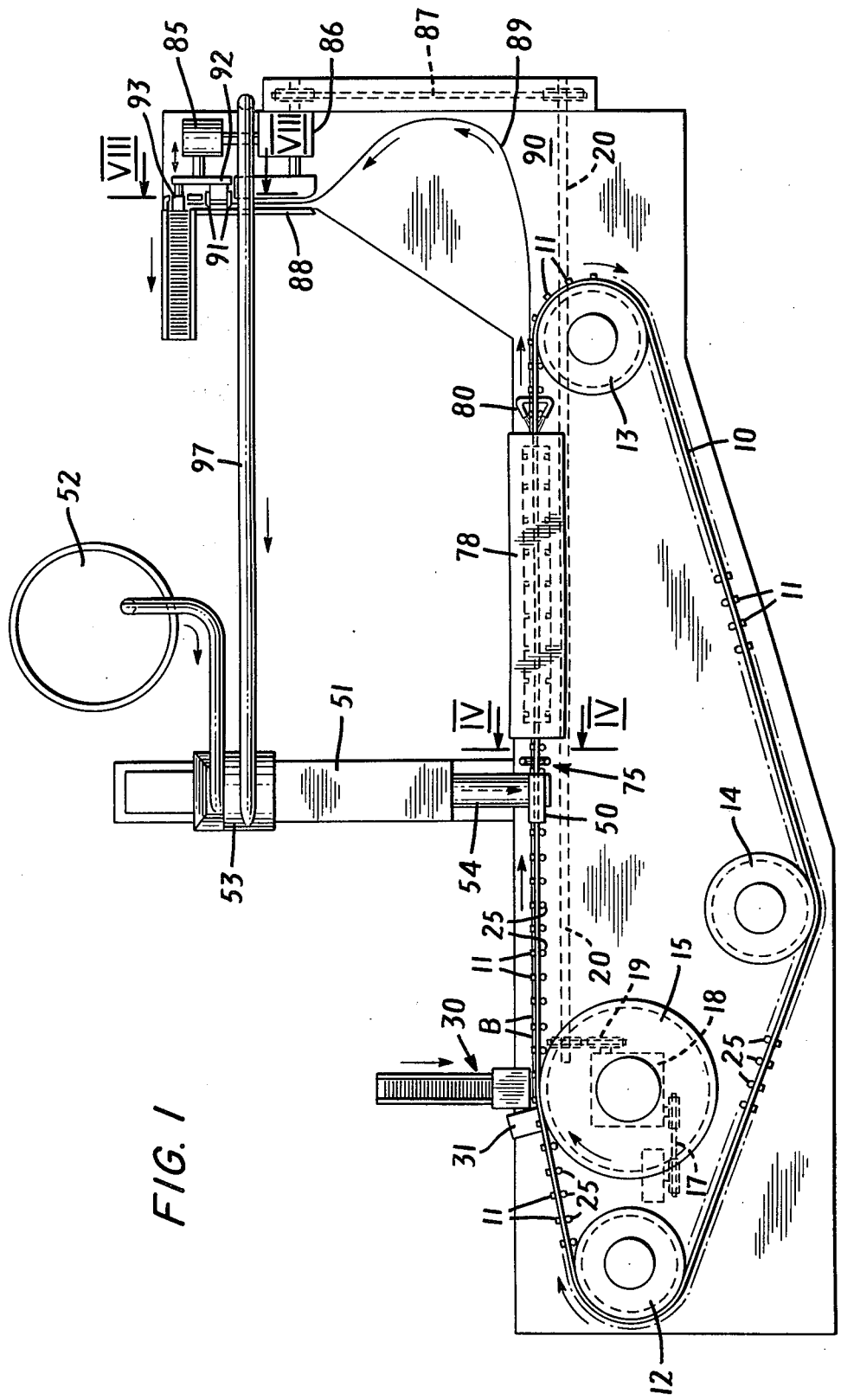
FIG. 1 is a top plan view of the complete apparatus.
Figure 2:
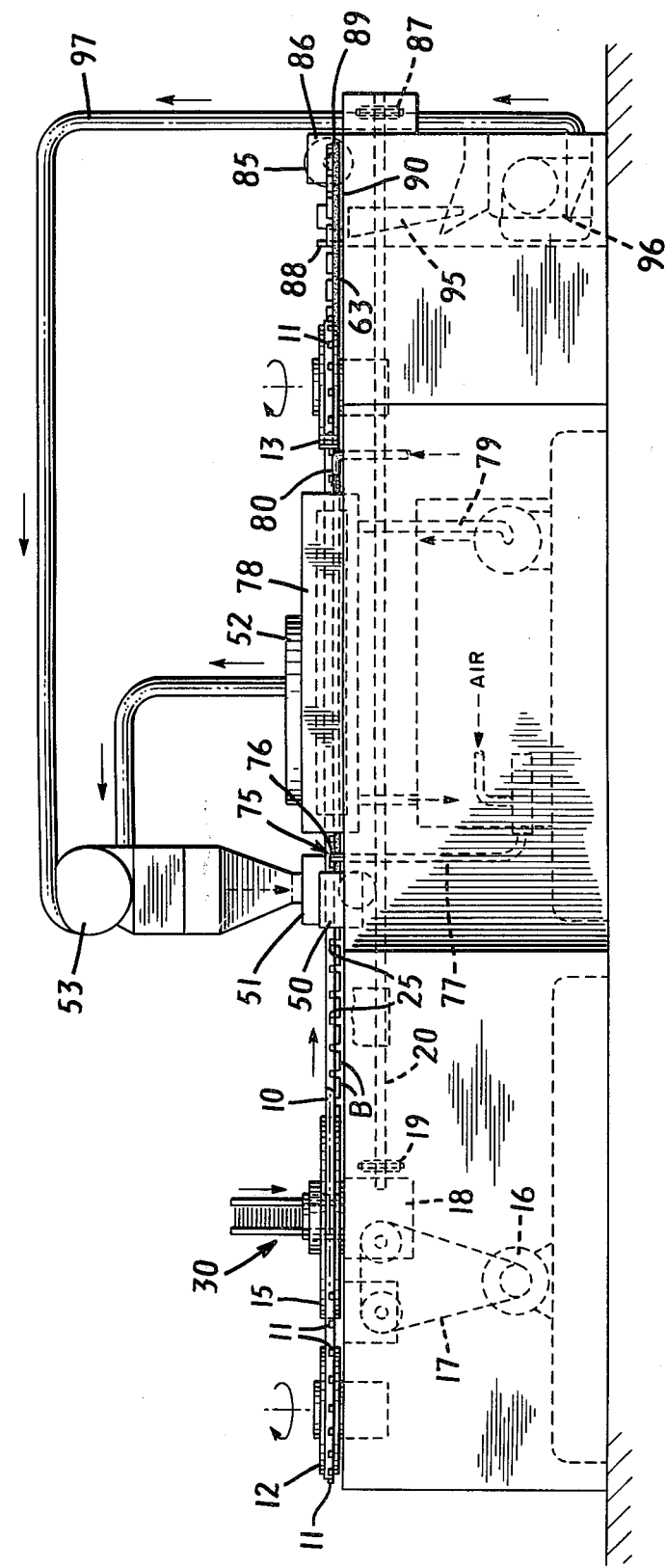
FIG. 2 is a view in elevation of the complete apparatus.

Referring first to FIGS. 1 and 2, the general features of the apparatus include a carrier 10 comprising preferably an endless steel band having on its outer surface successive lugs 11 defining between lugs a space for successive blades. The conveyor 10 extends around a pair of fixed idler rolls 12 and 13, an adjustable tension roll 14 and a feed roll 15. The feed roll is driven from a power source 16 through a chain or belt 17 and an intervening speed reducer 18, which is also connected at 19 to drive shaft 20 which in turn drives other mechanism as will be described hereinafter.

Figure 3:
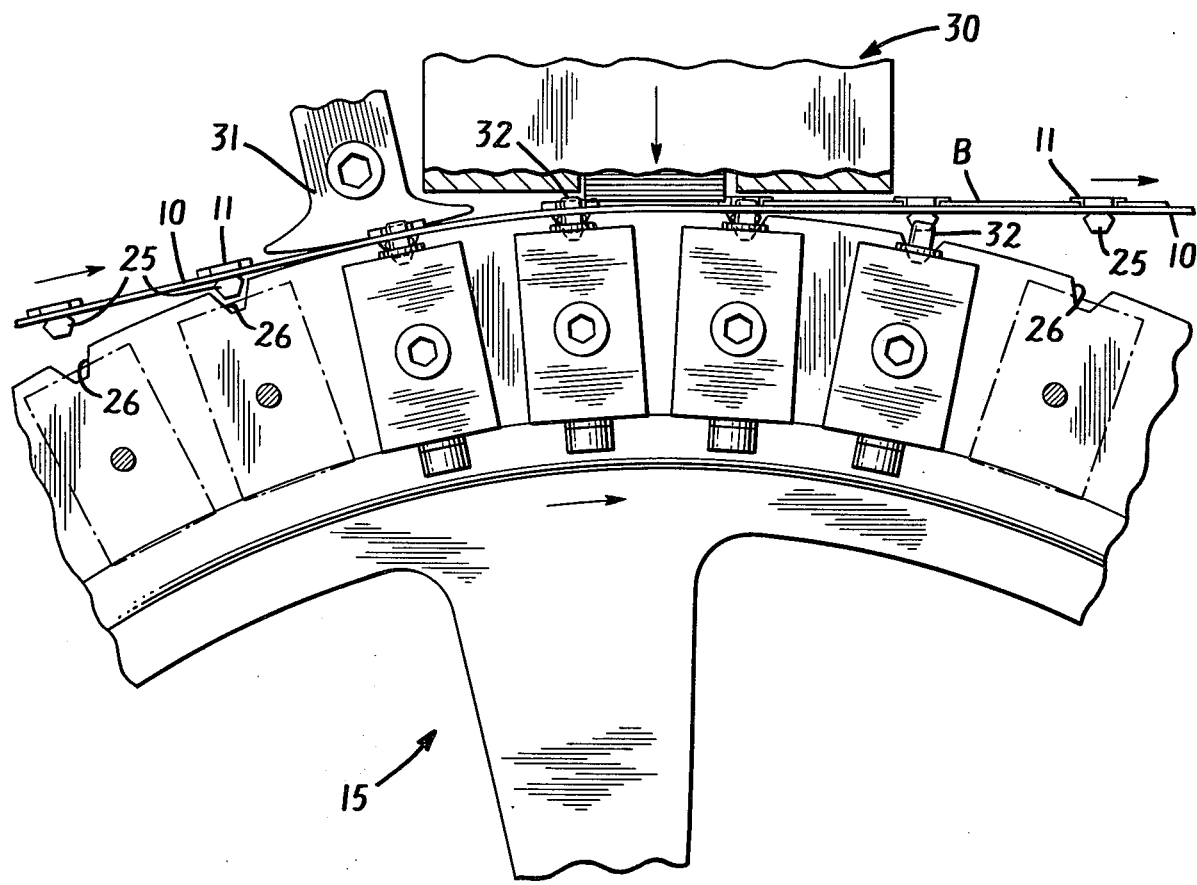
FIG. 3 is a fragmentary in plan on an enlarged scale showing the feeding means through the blade pick-up station.

Mounted on the belt 10 opposite the lugs 11 are driving teeth 25 adapted to engage in peripheral notches 26 in fed roll 15 (FIG. 3). The means for feeding blades B to the belt 10 and picking up the individual blades and positioning them on the belt 10 may vary and in part at least is shown only diagrammatically. In the present case the blade supply and individual feed mechanism is indicated generally at 30 adapted to present blades one by one to the belt conveyor to be picked up and positioned between the respective pairs of lugs 11. The belt is guided into the blade pick-up area by suitable means indicated generally at 31. Mounted on the feed drum 15 are spring pressed blade feed plungers 32 traveling in a path above the lugs 11 adapted to engage the rear end of the corresponding blade B. The belt 10 has openings 41 (FIG. 6) through which the plungers 32 extend to engage against the rear ends of the blades.

The particular blades illustrated correspond generally to razor blades commonly sold under the name "Gem" which have end notches 40 and the lugs 11 are correspondingly T-shaped to engage in the notches and preferably provide also a cross rib indicated at 11a (FIG. 6) to result in a spacing between the adjacent ends of the respective blades. The plungers 32 and lugs 11 cooperate to maintain an accurate central and lateral positioning of the cutting blades on the conveyor.

The blades arranged seriatim on the conveyor 10 are advanced through an extrusion die and plastic feeding means of a suitably selected type common in the prior art. In the present arrangement the die indicated generally at 50 is fed with the desired plastic material under pressure from an extruding machine 51 automatically loaded from a source of plastic material 52 through hopper means 53. The die adapter block 54 may include suitable electrical heating means 55.

Figure 8:
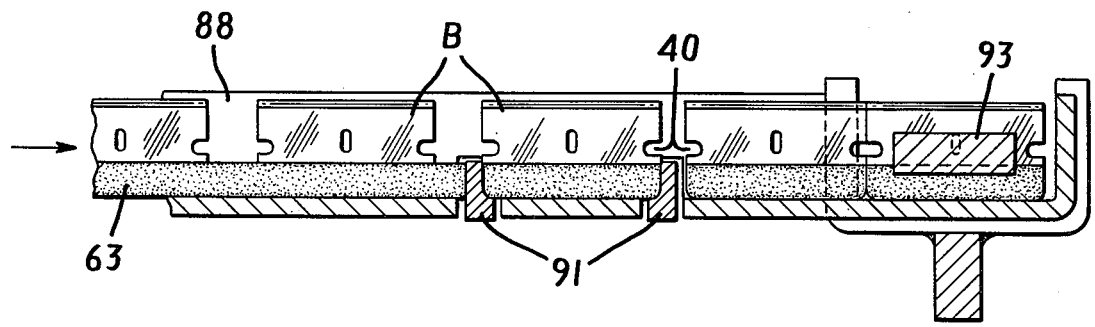
FIG. 8 is a view in elevation taken on the plane VIII-VIII of FIG. 1 showing the strip severing means and also the apparatus for moving the severed blade units laterally to a receiver.

Details of the extrusion die are shown particularly in FIGS. 4 and 5. It includes front and back halves 60 and 61 respectively which are complimentary and have mating grooves forming a conduit passage 62 through which plastic material is forced under pressure to form a continuous strip 63 in which the rear edges of the blades B are fully imbedded as indicated in FIGS. 4, 5 and 8. The blades are resting on the conveyor strip 10, and the conveyor and the overlying blades are fed through guide slots in the die body formed by a front guide block 66 and a back guide block 67. It may be noted that the front guide block 66 is so designed as to guide the conveyor strip horizontally and vertically allowing proper clearance for the driving teeth riveted to the conveyor and the blade locating lugs. It may also be noted that the shape of the lugs 11 is such as to maintain an extremely accurate position of the blades both longitudinally and laterally whereby the cutting edge B' is maintained out of contact with any metal wall and the width of the rear edge imbedded within the plastic strip is maintained centrally.

The amount to which the plastic material extends forward toward the blade cutting edge is limited by carbide inserts 68 brazed or welded to the front guide block 66 and the back guide block 67. The plastic material may be selected from a variety of thermoplastic materials well known commercially having characteristics suitable for the purpose, such as polypropylene.

In order to set the plastic quickly to maintain its shape as the strip emerges from the die it enters immediately through a coolant spray curtain which may vary in character but a suitable form is indicated in FIGS. 1, 2 and 4 at 75. It includes a "U" shaped tube 76 having apertures connected to supply tube 77 adapted to spray the coolant fluid being air or water for example. From there the strip passes through an elongated cooling chamber 78 which may vary as to character and length depending upon the circumstances. Suitable supply conduit means for coolant fluid are indicated diagrammatically at 79. Preferably as the strip emerges from the cooling chamber 78 it passes through an air blowoff means 80 comprising a suitable arrangement of air jets to remove any adherent surface layers of the coolant medium.

The plastic strip with the contained blades leaves the conveyor at the idler roll 13 and is fed to a plastic strip severing means indicated generally at 85 (FIGS. 1 and 8). The strip is picked up by an intermittent feed mechanism 86 driven from the main shaft 20 by a belt or chain 87 which advances the strip step by step through suitable guide means 88 to the severing means. The details of the intermittent feed mechanism are not illustrated since the exact form may vary in accordance with well known devices for that purpose. Although the feed mechanism is operated in timed relation with the strip advance through the plastic applying means, because of the intermittent advance at the severing means, the strip includes a strip loop section 89 which rides edgewise on a flat table section 90.

The severing means is indicated more fully in FIG. 8 taken in conjunction with the plan view of FIG. 1. It includes a pair of knife blades 91 mounted on a bar 92 cooperating with a suitable female die part. Preferably the blades are shaped and spaced apart to the exact desired length of the plastic backing.

The bar 92 may also have secured thereto a pusher head 93 which serves to move the previously severed blade unit forward to a desired receiver simultaneously with the cutting out of the next blade unit. The plastic sections removed from the strip may be withdrawn downwardly through chute 95 to a granulating device 96 and returned in a suitable manner through pipe 97 (FIG. 2) to the main plastic supply system.

The invention accordingly comprises the several steps and their relation and an apparatus embodying features of construction and combination of parts which are adapted to effect such steps, all as exemplified in the representative embodiment herein disclosed and the scope of the invention will be indicated in the claims.

What is claimed is:

1. An apparatus for forming a backing of plastic material on an edge of cutting blades comprising a continuous conveyor belt, means for driving the belt, means for depositing blades seriatim on the belt, said belt having lugs on its surface forming spacers between adjacent blade ends on said belt, an extrusion die through which said belt with the blades is advanced with means for forming a continuous strip of the plastic material with the edge of the blades fully imbedded therein, and cooling means through which the strip is fed from the extrusion die.

2. An apparatus in accordance with claim 1 in which said lugs are shaped to engage in notches in the adjacent ends of the blade and maintain the blades in a predetermined lateral position in advancing through the extrusion die.

3. An apparatus in accordance with claim 1 in which said belt driving means comprises a rotary feed roll, and the belt has belt driving lugs engageable in notches in the periphery of said roll.

4. An apparatus in accordance with claim 3 in which said feed roll has plungers on its periphery arranged to project through holes in said belt and engage the rear end of successive blades for advancing them in timed relation with the belt travel.

5. An apparatus in accordance with claim 1 in which said cooling means includes a first cooling fluid spray closely adjacent the strip followed by an elongated chamber with cooling medium therein.

6. An apparatus in accordance with claim 1 which includes a strip severing means through which the strip is fed after the cooling means, said severing means being arranged to shear the strip between successive blades to form individual blade units.

7. An apparatus in accordance with claim 6 which includes a strip loop storage means between the cooling means and the severing means and means for intermittently advancing the strip through severing means.

* * * * *